United States Patent [19]
Gandolfo

[11] Patent Number: 5,362,199
[45] Date of Patent: Nov. 8, 1994

[54] LIGHT-SENSITIVE FILM FEEDING MAGAZINE FOR USE IN A DAY-LIGHT AUTOMATIC FILM HANDLING APPARATUS

[75] Inventor: Rino Gandolfo, Roccavignale, Italy

[73] Assignee: Minnesota Mining and Manufacturing Company, St. Paul, Minn.

[21] Appl. No.: 963,116

[22] Filed: Oct. 19, 1992

[30] Foreign Application Priority Data

Oct. 21, 1991 [IT] Italy ............ MI91 A 002772

[51] Int. Cl.$^5$ ........................... B65H 9/10
[52] U.S. Cl. ........................... 414/788; 354/312; 414/907
[58] Field of Search ............ 271/221, 222, 223, 224; 354/310, 312, 315, 344; 414/788, 907, 923; 378/173, 182

[56] References Cited

U.S. PATENT DOCUMENTS 4,548,399 10/1985 Heider et al. ............ 271/221
4,809,313 2/1989 Gandolfo ............ 378/182

FOREIGN PATENT DOCUMENTS 4-319952 11/1992 Japan ............ 354/312

Primary Examiner—Michael S. Huppert
Assistant Examiner—Janice Krizek
Attorney, Agent, or Firm—Gary L. Griswold; Walter N. Kirn; Mark A. Litman

[57] ABSTRACT

A light-sensitive film feeding magazine (1), for use in a day-light automatic film handling apparatus, includes a device for centering the films of a stack inserted in the magazine (1). Such a device includes a sliding tray (7) guided on a bottom wall (2) of the magazine (1), a side buffer (15) provided oil the tray (7), perpendicular to the bottom wall (2) and parallel to the axis (X) of the magazine (1), a pushing device means for pushing the stack of films on the tray (7) against the buffer. and a shifting device for shifting the tray (&) on the bottom wall (2) toward a position in which films resting against the buffer have axes coincident with the axis (X) of the magazine (1). With this magazine (1) it is possible to center the films at a central location of the magazine (1) without loosing space in the transverse direction.

12 Claims, 1 Drawing Sheet

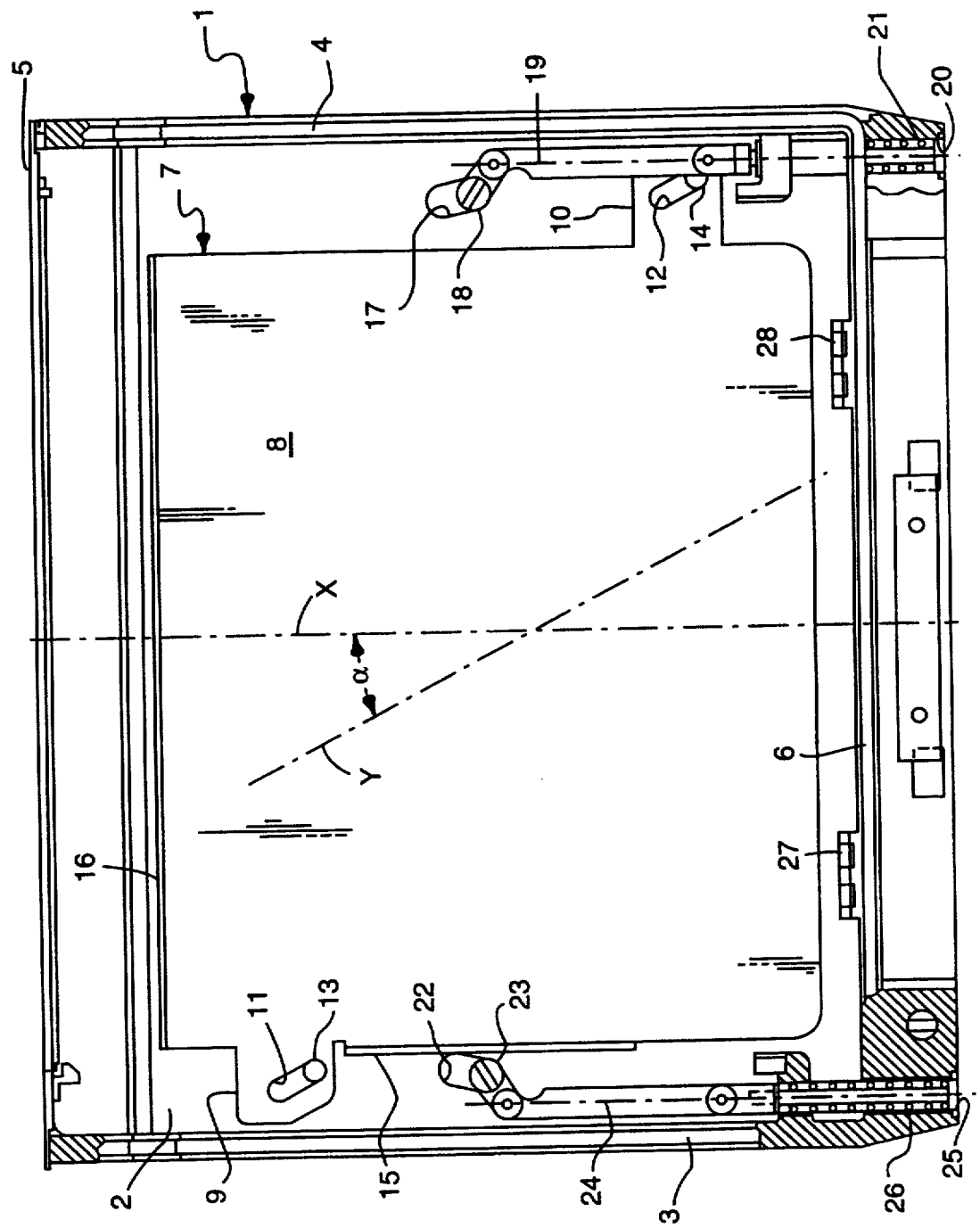

LIGHT-SENSITIVE FILM FEEDING MAGAZINE FOR USE IN A DAY-LIGHT AUTOMATIC FILM HANDLING APPARATUS

DESCRIPTION

1. Field of the Invention

The present invention relates to a light sensitive film feeding magazine, for use in a day-light automatic film handling apparatus.

2. Background of the Art

Daylight loading automatic film feeding magazines must have a device for centering the stack of films. To have the apparatus work properly, the film must be exactly positioned and centered with respect to a film pick-up device of the apparatus. This is particularly important with day-light magazines, in which the stack of films is left in the magazine with a clearance of some mm after the removal of the light-tight envelope. The removal of the envelope is performed by means of well known unwrapping mechanisms.

Usually centering is performed at a lateral location of the magazine, against fixed buffers or the like, where films are moved by suitable pushers. An example is given in U.S. Pat. No. 4,809,313, in which the buffer and the pusher are respectively a fixed and a movable gauge. The latter is mechanically activated upon insertion of the magazine into the apparatus.

It may be desired to center the films at a central location of the magazine, i.e. with the axis of the stack of films coincident with the axis of the magazine. This is possible with known magazines, by placing the fixed buffers at a predetermined location dependent upon the size of the films to be used in the magazine.

However, this configuration does not fully use the inside space of the magazine. All the space beyond the buffer is wasted. In fact, the extra space required by the light-tight envelope cannot be provided on both sides of the magazine, but only on the side opposite to the buffer. This results in an increase in the width of the magazine, which is not a minor inconvenience, since the overall dimensions of the magazine are to be kept as small as possible, to make handling and carrying easier. It must be considered also that all magazines to be used in an apparatus must have the same width to ensure interchangeability. Thus, magazines for small films have the same width as the magazine for films having the largest size.

BRIEF DESCRIPTION OF THE INVENTION

The problem at the basis of the present invention is to provide a magazine as small as possible, in which films are centered at a central location, with their axes coincident with the axis of the magazine.

This problem is solved, according to the invention, by a light-sensitive film feeding magazine, for use in a day-light automatic film handling apparatus, which includes means for centering the films of a stack inserted in the magazine, characterized in that such means include a sliding tray guided by a bottom wall of the magazine, a side buffer of the tray, perpendicular to the bottom wall and parallel to the axis of the magazine, pushing means for pushing the stack of the films on the tray against the buffer, shifting means for shifting the tray on the bottom wall toward a position in which films resting against the buffer have axes coincident with the axis of the magazine.

In this way, when the magazine is to be loaded with a stack of films, the side buffer is close to the side wall of the magazine. The entire inner width of the magazine is available to receive the stack of films.

Preferably, the pushing means comprise a first lever acting on the side of the stack of films, hinged to the magazine and movable between a loading position in which it is relatively farther from the side buffer, and a centering position in which it is relatively closer to the side buffer, and first spring means to bias the first lever toward the loading position. This kind of pushing means is preferred because of the simplicity and reliability in operation. More preferably, the first lever is driven from the loading to the centering position by a first actuating rod, axially sliding in a direction parallel to the axis of the magazine and susceptible of being pushed by external means provided on the film handling apparatus upon insertion of the magazine into the apparatus.

Preferably, the shifting means comprise a second lever acting on the side of the tray, hinged to the magazine and movable between a loading position in which it is relatively farther from the tray, and a centering position in which it is against the tray, and a second spring means to bias the second lever toward the loading position. This kind of shifting means is preferred because of the simplicity and reliability in operation. More preferably, the second lever is driven from the loading to the centering position by a second actuating rod, axially sliding in a direction parallel to the axis of the magazine and susceptible of being pushed by external means provided on the film handling apparatus upon insertion of the magazine into the apparatus. Still more preferably, the second lever acts on the side buffer.

Advantageously, centering in the longitudinal direction of the magazine can be performed. To this end, the magazine comprises a buffer provided on the tray, which buffer is perpendicular to the bottom wall and to the side buffer and parallel to both the axis of the magazine and also means for centering the films in a longitudinal direction on the tray against the front buffer.

In order to perform both transverse and longitudinal centering simultaneously and with maximum efficiency and reliability, the tray is guided on the bottom wall of the magazine along a sliding direction oblique to the axis of the magazine, so that the sliding movement of the tray has components both in the direction perpendicular to the side buffer and in the direction perpendicular to the front buffer. The sliding direction preferably forms an angle of 20° to 70° with the axis of the magazine, more preferably about 25° to 50° and most preferably 30° to 40° or about 35°.

To obtain the desired oblique sliding direction easily, the magazine comprises at least two parallel slots provided in the tray extending in the oblique sliding direction, and two respective pins fixed to the bottom wall of the magazine slidingly engaged in the slots.

Centering in the longitudinal direction may be obtained by means similar to the means for centering the films in a longitudinal direction, which comprise the shifting means, the slots and pins and at least an arrester, fixed to the magazine opposite to the front buffer of the tray.

Further features and advantages of the invention will be apparent from the following description of a preferred embodiment, given by way of example with reference to the enclosed drawing.

BRIEF DESCRIPTION OF DRAWING

The FIGURE is a top view of a magazine according to the invention, shown without any cover, in a film loading position.

DETAILED DESCRIPTION OF A PREFERRED EMBODIMENT

In the FIGURE, a magazine 1 is shown, intended to be inserted in a suitable housing of an apparatus for automatic handling of light sensitive films in day-light conditions. Such apparatus is not shown for the sake of clarity, being anyway well known in the art.

The magazine 1 has a substantially flat parallelepiped shape, with a bottom wall 2, two side walls 3 and 4, two front walls 5 and 6, and a top cover (not shown).

Inside the magazine 1, a sliding tray 7 is provide, which comprises a rectangular plate 8 on which stacks of films (not shown) are loaded. The plate 8 has two coplanar flat wings 9 and 10, projecting at opposite sides of the plate 8. The tray 7 is guided on the bottom wall 2 of the magazine 1 by means of two parallel slots 11 and 12 formed in the wings 9 and 10, which are engaged by two respective pins 13 and 14 fixed to the bottom wall 2 and projecting therefrom.

The slots 11 and 12 are so oriented as to determine a sliding direction Y which is oblique with respect to the axis X of the magazine 1. In particular, the angle alpha between the axis X and the direction Y is between 20° and 70°, preferably between 30° and 40° or 45°. In the example shown, α is about 35°.

The tray 7 further comprises a side buffer 15 and a front buffer 16, perpendicular to each other and to the bottom wall 2, parallel and relatively close to the side wall 3 and the front wall 5. Buffers 15 and 16 project from the plate 8 on the opposite side of the bottom wall 2.

The magazine 1 further comprises a first lever 17, hinged to the bottom wall 2 via a pivot 18, perpendicularly fixed to the bottom wall 2 at a location between the side wall 4 and the tray 7. Lever 17 is connected to a driven by a first actuating rod 19, axially sliding in a respective seat 20 in the magazine 1 along a direction parallel to the axis X. First spring means 21 are provided around the rod 19, which force the rod 19 to bias the lever 17 toward a film loading position. Upon insertion of the magazine 1 into the film handling apparatus, external means (not shown) provided on the apparatus force the rod 19 to bias the lever 17 toward a film centering position, against the elastic action of the spring means 21. Elements numbered 17 to 21 form together pushing means for pushing the stack of films on the tray 7 against the buffers 15 and 16.

Furthermore, the magazine 1 comprises a second lever 22, hinged to the bottom wall 2 via a pivot 23, perpendicularly fixed to the bottom wall 2 at a location between the side wall 3 and the tray 7. Lever 22 is connected to and driven by a second actuating rod 24, axially sliding in a respective seat 25 in the magazine 1 along a direction parallel to the axis X. Second spring means 26 are provided around the rod 24, which force the rod 24 to bias the lever 22 toward a film loading position. Upon insertion of the magazine 1 into the film handling apparatus, external means (not shown) provided on the apparatus force the rod 24 to bias the lever 22 toward a film centering position, against the elastic action of the spring means 26. Elements numbered 22 to 26 together form shifting means for shifting the tray 7 on the bottom wall 2 toward a position in which films (not shown) resting against the buffer 15 have axes coincident with the axis X of the magazine 1.

Two arresters 27 and 28 are provided in the magazine 1, fixed to the front wall 6 thereof, opposite the front buffer 16.

Operation of the magazine 1 will be described in the following.

In the film loading position, pushing means and shifting means are in a position which permits easy loading of a stack of films wrapped in a light-tight envelope (not shown), upon the tray 7. Levers 17 and 22 are relatively close to the side walls 4 and 3 respectively and the tray 7 is relatively close to the side wall 3 and the front wall 5.

After having loaded the stack of films, closed the magazine and unwrapped the films, the magazine 1 is inserted into its housing in the film handling apparatus. Upon insertion, means provided on the apparatus (such as pins, protrusions, brackets or the like) push axially on the actuating rods 19 and 24. Sliding movement of the rods 19 and 24 causes rotation of the levers 17 and 22, in contrast to the elastic action of spring means 21 and 25.

Therefore, the lever 22, driven by the rod 24, pushes onto the side buffer 15, forcing the tray 7 to shift. At the same time, lever 17 pushes directly onto the films (not shown) on the tray 7, forcing them to move on the tray 7. Therefore, films are centered between the lever 17 and the side buffer 15. At the end of the insertion of the magazine 1, the films (not shown) will be on the tray 7 in such a position where their axes are coincident with the axis X of the magazine 1.

While centering in a transverse direction is so performed, centering in a longitudinal direction is performed at the same time. In fact, the sliding movement of tray 7 has components both in the longitudinal (perpendicular to the front buffer 16) and in the transverse (perpendicular to the side buffer 15) direction, depending upon the angle alpha. Therefore, shifting of the tray 7 causes centering of films on the tray 7 itself between the front buffer 16 and the arresters 27 and 28.

I claim:

1. A light-sensitive film feeding magazine (1) having a front wall (5) and an axis (X) perpendicular to said front wall (5), for use in a day-light automatic film handling apparatus, including means for centering the films of a stack of films inserted in the magazine (1), characterized in that such means include a sliding tray (7) guided on a bottom wall (2) of the magazine (1), a side buffer (15) provided on the tray (7) perpendicular to the bottom wall (2) and parallel to the axis (X) of the magazine (1), pushing means comprising a first movable lever (17) acting on the side of the stack of films for pushing the stack of films on the tray (7) against the side buffer (15) and shifting means comprising a second movable lever (22) acting on the side buffer (15) for shifting the tray (7) on the bottom wall (2) toward a position in which films resting against the side buffer (15) have axes coincident with the axis (X) of the magazine (1).

2. The feeding magazine (1) according to claim 1, wherein the pushing means comprise the first lever (17) acting on the side of the stack of films, hinged to the magazine (1) and movable between a loading position in which said first lever is relatively farther from the side buffer (15) and a centering position in which said first lever is relatively closer to the side buffer (15), and spring means to bias the first lever (17) toward the loading position.

3. A feeding magazine (1) according to claim 2, wherein the first lever (17) is driven from the loading to the centering position by a first actuating rod (19), axially sliding in a direction parallel to the axis (X) of the magazine (1) and susceptible of being pushed by external means provided on the film handling apparatus upon insertion of the magazine (1) into the apparatus.

4. A feeding magazine (1) according to claim 1, wherein the shifting means comprise the second lever (22) acting on the side of the tray (7), hinged to the magazine (1) and movable between a loading position in which said second lever is relatively farther from the tray (7) and a centering position in which the second lever pushes against the tray (7) and spring means to bias the second lever (22) toward the loading position.

5. A feeding magazine (1) according to claim 4, wherein the second lever (22) is driven from the loading to the centering position by a second actuating rod (24), axially sliding in a direction parallel to the axis (X) of the magazine (1) and susceptible of being pushed by external means provided on the film handling apparatus upon insertion of the magazine (1) into the apparatus.

6. A feeding magazine (1) according to claim 4, wherein the second lever (22) acts on the side buffer (15).

7. A feeding magazine (1) according to claim 1, comprising a front buffer (16) provided on the tray (7) perpendicular to the bottom wall (2) and to the side buffer (15) and perpendicular to the axis (X) of the magazine (1), and means for centering the films in a longitudinal direction on the tray (7) against the front buffer (16).

8. A feeding magazine (1) according to claim 7, wherein the tray (7) is guided on the bottom wall (2) of the magazine (1) along a sliding direction (Y) oblique with respect to the axis (X) of the magazine (1), so that the sliding movement of the tray (7) has components both in the direction perpendicular to the side buffer (15) and in the direction perpendicular to the front buffer (16).

9. A feeding magazine (1) according to claim 8, wherein the sliding direction (Y) forms an angle of 20° to 70° with the axis (X) of the magazine (1).

10. A feeding magazine (1) according to claim 9, wherein the angle between the sliding direction (Y) and the axis (X) of the magazine (1) is 30° to 40°.

11. A feeding magazine (1) according to claim 8, comprising at least two parallel slots (11,12) provided in the tray (7) extending in the oblique sliding direction (Y), and two respective pins (13, 14) fixed to the bottom wall (2) of the magazine (1) slidingly engaged in the slots (11,12).

12. A feeding magazine (1) according to claim 11, wherein the means for centering the films in a longitudinal direction comprise the shifting means, the slots (11,12) and pins (13, 14) and at least an arrester (27, 28), fixed to the magazine (1) opposite to the front buffer (16) of the tray (7).

* * * * *

UNITED STATES PATENT AND TRADEMARK OFFICE
CERTIFICATE OF CORRECTION

PATENT NO. : 5,362,199
DATED : November 8, 1994
INVENTOR(S) : Gandolfo

It is certified that error appears in the above-indentified patent and that said Letters Patent is hereby corrected as shown below:

Column 3, line 17, delete "provide"
and insert --provided--.

[57]  Abstract line 6, delete "oil"
and insert --on--.

[57]  Abstract line 8, delete "means".

[57]  Abstract line 10, delete "(&)"
and insert --(7)--.

Signed and Sealed this

Fourteenth Day of March, 1995

*Attest:*

BRUCE LEHMAN

*Attesting Officer*     *Commissioner of Patents and Trademarks*